United States Patent [19]

Porter et al.

[11] Patent Number: 4,884,326
[45] Date of Patent: Dec. 5, 1989

[54] METHOD AND APPARATUS FOR HYDRAULIC TURBINE ROTATION FOR REPAIR

[75] Inventors: Benny R. Porter, Chattanooga, Tenn.; Doyle G. Bowers, Humble, Tex.

[73] Assignee: Arc Plan, Inc., Chattanooga, Tenn.

[21] Appl. No.: 325,762

[22] Filed: Mar. 20, 1989

[51] Int. Cl.⁴ .............................................. B21K 3/00
[52] U.S. Cl. ............................ 29/156.8 R; 29/402.01; 29/402.18; 82/117
[58] Field of Search .................. 29/156.8 R, 156.8 B, 29/402.01, 402.18; 82/2; 137/15

[56] References Cited

U.S. PATENT DOCUMENTS

| | | |
|---|---|---|
| 2,546,225 | 3/1951 | Julian et al. |
| 2,818,685 | 1/1958 | Becker |
| 3,521,346 | 7/1970 | Tongurian |
| 3,704,500 | 12/1972 | Okamoto |
| 3,711,927 | 1/1973 | Davidson |
| 3,793,698 | 2/1974 | Goings ........................... 29/156.8 B |
| 3,797,085 | 3/1974 | Aartman ........................ 29/156.8 R |
| 3,923,418 | 12/1975 | Chacour |
| 4,028,788 | 6/1977 | Demusis ......................... 29/156.8 B |
| 4,095,451 | 6/1978 | Watton ........................... 29/156.8 B |
| 4,121,894 | 10/1978 | Cretella et al. |
| 4,285,108 | 8/1981 | Arrigoni ......................... 29/156.8 B |
| 4,805,282 | 2/1989 | Reaves et al. .................. 29/156.8 B |

Primary Examiner—Howard N. Goldberg
Assistant Examiner—Irene Cuda
Attorney, Agent, or Firm—Varnum, Riddering, Schmidt & Howlett

[57] ABSTRACT

A method and apparatus is disclosed for rotation of a hydroelectric assembly (1) for purposes of repairing and resurfacing of turbine liner walls (8) pitted as a result of cavitation. The method includes rotation of turbine blades (6) and a turbine shaft (7) through a turning mechanism (18) positioned on a blade (6) so that turning forces are exerted directly between the turning mechanism and the surface of the liner wall (8). The turning mechanism (18) comprises a mounting assembly (19) which mounts a turning wheel (22) driven by a motor drive assembly (24) through a gear reduction mechanism (26). A biasing assembly (27) is provided to selectively urge the turning wheel (22) into frictional contact with the surface of the liner wall (8).

18 Claims, 2 Drawing Sheets

METHOD AND APPARATUS FOR HYDRAULIC TURBINE ROTATION FOR REPAIR

DESCRIPTION

1. Technical Field

The invention relates to the repair of hydroelectric assemblies and, more particularly, relates to methods and apparatus for rotation of hydroelectric turbines during the repair process.

2. Background of the Invention

Historically, hydroelectric facilities have been utilized for purposes of generating electricity through the use of power resulting from movement of water through gravitational forces. Such facilities can comprise one or more electrical generator units, with each unit powered by a hydraulic turbine mechanism.

Modern hydroelectric facilities typically are designed around a vertically mounted shaft. Attached to the upper portion of the shaft is a generator rotor. Correspondingly, an hydraulic turbine assembly is typically attached adjacent the lower portion of the shaft, and comprises a series of turbine blades. The water enters the area of the turbine mechanism at a point above the turbine blades. Through gravitational forces, the movement of the water causes the rotation of the turbine blades at a speed sufficient so as to cause the generator portion of the facility to appropriately generate electricity.

The internal environment of the hydroelectric turbine assemblies is relatively severe. That is, the turbine blades are subjected to relatively large stresses resulting from the water movement and blade rotation. In addition, the walls surrounding the turbine blades, typically characterized as the liner wall, are also subjected to severe stresses.

Such stresses are commonly explained in accordance with known principles of fluid mechanics. For example, the water flow within a hydraulic turbine will cause a phenomenon known as "cavitation." This phenomenon will subject fluid flow surfaces (e.g. liner walls and turbine blade surfaces) to intense local stressing, which appears to damage flow surfaces by fatigue. Cavitation within a hydraulic turbine will result in pitting and general surface deterioration of liner walls and blades.

The principles of cavitation and other fluid mechanics stress phenomenon are relatively well known, and are explained in conventional texts such as Streeter, *Fluid Mechanics* (McGraw-Hill 1966 4th Ed.). Cavitation occurs in a flowing liquid whenever the local pressure of the liquid falls to the liquid vapor pressure. When this point is reached, local vaporization of the liquid will result, causing a hole or cavity in the flow of the liquid. The cavity contains a swirling mass of droplets and vapor. When the pressure exerted on the flowing liquid is raised above the vapor pressure of the liquid, the low-pressure cavity rapidly collapses and the surrounding liquid rushes in to fill the void. At the point of disappearance of the cavity, the inrushing liquid comes together and momentarily raises the local pressure within the liquid to a very high level. When the point of collapse of the cavity is in contact with a metal surface, the surface may be stressed locally beyond its elastic limit, resulting eventually in fatigue, pitting and destruction of the material. In a hydroelectric facility, cavitation occurs on the turbine blades and the interior walls or lining of the turbine in the area of the turbine blades. Typically, cavitation erosion on these surfaces in a hydroelectric facility must be repaired relatively frequently, e.g. once per year.

A common method for repairing cavitation erosion on these surfaces is to remove the heavily pitted material by various grinding means, and then replace this removed material by a welding process. In the past, such repair has been accomplished by various hand-held grinding tools and replacing the ground material by welding stainless steel to the ground surfaces. These conventional methods of repair are extremely slow and expensive due to the lengthy down-time of the hydroelectric unit being serviced.

An attempt to speed up this repair process is disclosed in the U.S. Pat. No. 3,793,698 issued Feb. 26, 1974 to Goings. The Goings '698 patent is incorporated herein by reference. The Goings '698 patent discloses a semi-automatic method and apparatus for machining and welding the liner of a hydroelectric structure. The Goings apparatus includes machining tooling installed on a lower portion of the hydroelectric shaft, such that the tooling is brought into operative engagement with the tube wall or liner.

The generator portion of the hydroelectric structure disclosed in the Goings patent comprises a rotor which is moved by the runner or rotor of a hydraulic turbine. Gates control the entry of water into the draft tube of the turbine, with the blades of the turbine runner positioned within the upper cylindrical portion of the draft tube. The rotational axis of the turbine runner is concentric with the rotational axis of the rotor of the generator. The generator rotor has an extending portion which carries an annular shoe adapted to cooperate with an adjacent member which provides for braking the movement of the rotor, in the event of a failure or other emergency.

For purposes of repair, a temporary floor structure is constructed across the draft tube below a runner hub. A collector ring assembly is attached to the lower end of the runner, with the collector ring providing for transference of electrical power and pneumatic lines into the runner.

An external power unit is installed adjacent the extending portion, which rotates with the generator rotor. The power unit can include an electric motor having V-belts which drive a roller or traction member engaging the adjacent face of the annular track carried by the generator rotor portion. A control panel provides for control of the drive motor. Through reduction gearing between the motor and the traction member, energization of the motor results in a rotational force being applied to the generator rotor shaft and, correspondingly, to the runner shaft and runner. During rotation, machining and welding operations can be carried out on the draft tube liner.

While the Goings structure has provided advantages in operation over previously known arrangements for onsite repair of hydroelectric turbine surfaces, several problems still exist with respect to the method of operation of the Goings repair arrangement. For example, with the particular structure utilized in the Goings arrangement, and with the rotational forces applied to the generator rotor, it has been found that rotation of the turbine shaft and the machining tooling mounted to the turbine blades can be jerky and erratic. Accordingly, a relatively severe amount of chatter and vibration can occur during the machining operation.

Further, with the forces exerted directly on the generator rotor relatively far above the turbine blades, the rotational system is far removed from the location of the machining operations. Therefore, the rotational system is not convenient for purposes of precise and spontaneous adjustments of the rotation speed. Still further, with the positioning of the application of rotational forces at the perimeter of the generator rotor, relatively substantial forces are required to achieve appropriate rotational speed. Accordingly, motors of substantial size must be employed. Correspondingly, the motor apparatus for exerting the rotational forces is relatively bulky and expensive; The bulkiness can cause substantial problems and expense with respect to transportation and assembly of the apparatus at a job site.

SUMMARY OF THE INVENTION

In accordance with the invention, a method is adapted for use in a hydroelectric turbine structure comprising a turbine shaft, generator rotor assembly coupled to an upper portion of the shaft, a turbine blade assembly coupled to a lower portion of the shaft and comprising a plurality of turbine blades extending radially from the turbine shaft, and a turbine chamber having a cylindrical configuration formed by a vertically disposed liner wall adjacent distal ends of the turbine blades. The method is further adapted for repair of pitting and general deterioration of surfaces of the liner wall and the turbine blades.

The method comprises removing water from the turbine chamber, and mounting a repair assembly at or substantially adjacent a distal end of at least one of the turbine blades. The repair assembly can include conditioning devices for repairing surface deterioration of the liner wall. A turning apparatus is mounted at or substantially adjacent a distal end of at least one of the turbine blades. The turbine blades and turbine shaft are slowly rotated by exerting forces directly between the turning apparatus and the liner wall, thereby causing the conditioning devices to traverse the liner wall.

The mounting of the turning apparatus comprises the mounting of a support assembly directly to the turbine blade. A turning wheel is mounted in a pivotable configuration relative to the support assembly. The turning wheel is engaged with the liner wall so as to be in frictional contact therewith. Rotational forces are exerted on the turning wheel to rotate the turning wheel, thereby causing the turning wheel to traverse the liner wall, and further causing rotation of the turbine blades.

Rotation of the turbine blades is ceased by retracting the turning wheel so that the turning wheel is no longer in frictional contact with the liner wall. The turning wheel is driven by exerting rotational forces on the turning wheel through a motor assembly coupled to the wheel. The motor assembly is coupled to the turning wheel through a gear reduction mechanism. The turning wheel can be mounted to the support structure so that the turning wheel is selectively pivotable toward and away from the lining wall.

An apparatus for performing the previously described method includes a support structure adapted to be mounted to at least one of the turbine blades. Force exerting means are mounted to the support structure so as to provide a direct exertion of forces between the force exerting means and the liner wall, so that enablement of the force exerting means will cause slow rotation of the turbine blades and shaft. Rotating means are engagable in frictional contact with the liner wall for exerting forces against the liner wall in a manner so as to cause traversal of the rotating means along the liner wall. Drive means are coupled to the rotating means for exerting rotational forces on the rotating means.

The apparatus can include gear reduction means coupled to the drive means and to the rotating means to allow the drive means to operate at an operating speed different from a rotation speed of the rotating means. The rotating means can include an annular turning wheel. Further, the annular turning wheel can be composed of a neoprene material.

The apparatus further comprises pivot means coupled to the support structure and to the force exerting means for providing a pivot movement of the force exerting means relative to the support structure. The pivot means can include a piston cylinder, and a piston cylinder rod extendable and retractable relative to the piston cylinder. One end of the cylinder rod can be pivotably coupled to the support structure. A pivot assembly can be coupled to the force exerting means and to the piston cylinder, so as to allow the force exerting means to pivot toward and away from the liner wall.

The support structure can include a first support brace and a second support brace, with each of the support braces having one end secured adjacent a distal end of at least one of the turbine blades. A first pivot assembly can be pivotably coupled to an upper end of the support brace and to a distal end of the piston cylinder rod, so that the piston mechanism is pivotable in a pitch mode relative to a horizontal plane extending through the piston cylinder rod. A turning mechanism mounting bracket can also be provided, and a second pivot assembly can be provided for pivotably coupling one end of the piston cylinder with one end of the mounting bracket. A third pivot assembly can pivotably couple another end of the mounting bracket to an upper can be mounted to this mounting bracket.

BRIEF DESCRIPTION OF THE DRAWINGS

The invention will now be described with respect to the drawings, in which.

DESCRIPTION OF THE PREFERRED EMBODIMENT

Figure 1:
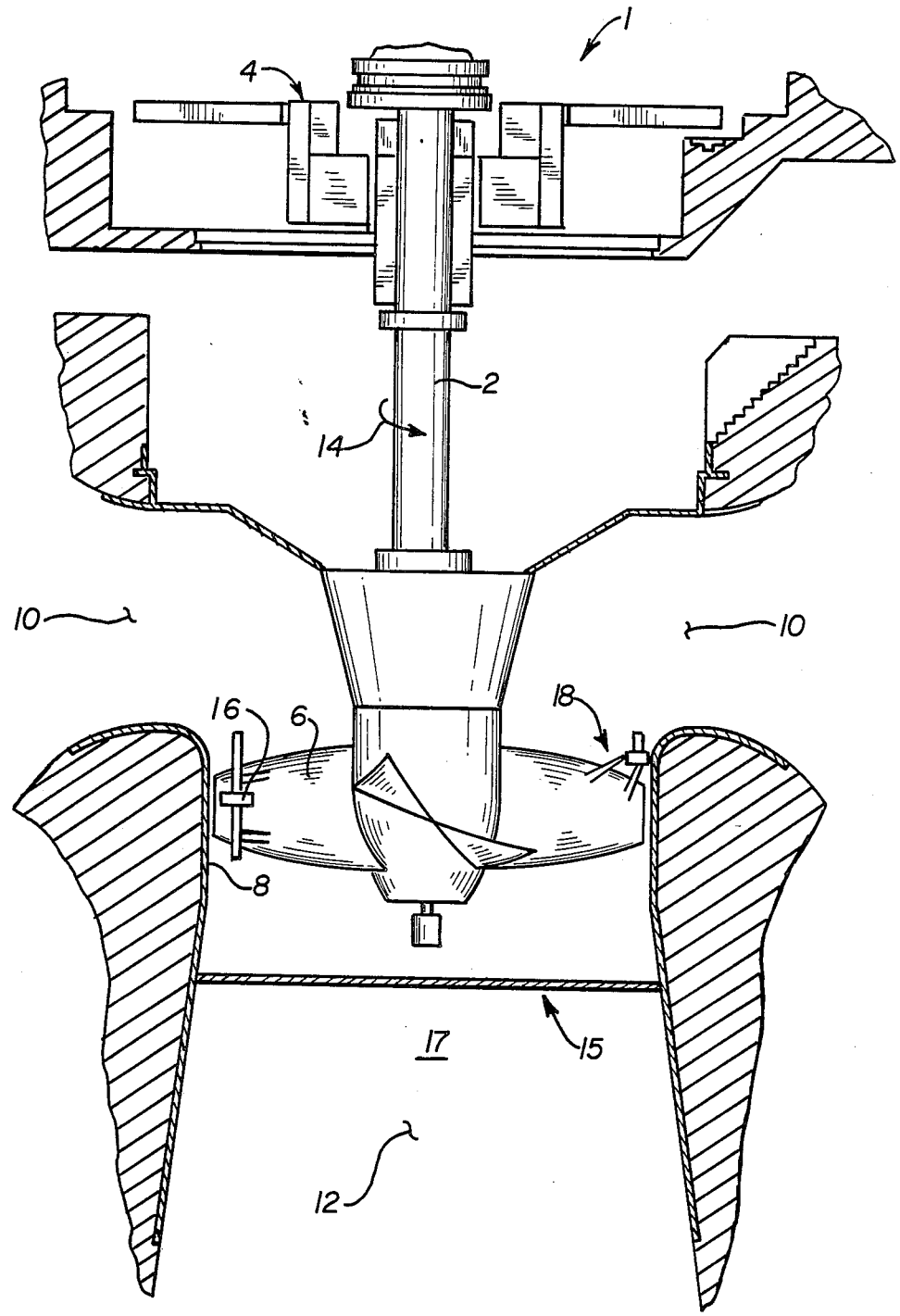
FIG. 1 is a sectional view generally illustrating a hydroelectric facility and generally showing the positional relationship of repair and rotational apparatus in accordance with the invention, relative to other components of the hydroelectric facility.

The principles of the invention are disclosed, by way of example, in a hydroelectric facility turbine structure 1 as illustrated in FIG. 1. As will be described in subsequent paragraphs herein, and in accordance with the invention, a turbine turning mechanism and associated components can be provided with the turbine structure 1 for purposes of repairing damage to turbine liner walls and blades, where the damage comprises pitting and other surface deterioration caused by phenomenon such as cavitation. In particular, the repair arrangement in accordance with the invention comprises an assembly for directly exerting forces between a turbine blade and a liner wall for purposes of achieving turbine blade rotation during repair operations.

Turning to FIG. 1, the hydroelectric turbine structure 1 comprises a vertically mounted turbine shaft 2 with a generator rotor assembly 4 mounted thereto. The generator rotor assembly 4 is a conventional assembly adapted for creation of electricity as the result of rotation. As further shown in FIG. 1, the generator rotor assembly 4 is typically mounted at the uppermost portion of the turbine shaft 2.

Adjacent and interconnected with the lower portion of the turbine shaft 2 is a series of turbine blades 6, two of which are illustrated in FIG. 1. The turbine blades 6 are mounted typically in a "pitched" configuration so that the terminating ends thereof are in close proximity to a turbine liner wall 8. The turbine liner wall 8 is typically constructed in the shape of a cylinder and is generally composed of a wearresistant and corrosion-resistant steel.

Although not specifically illustrated in FIG. 1, the turbine structure 1 will typically also include a series of gates for controlling the entry of water into an inlet channel 10. The inlet channel 10 is positioned above the turbine blades 6. As a result of gravitational forces, the water flowing into the inlet channel 10 will fall downwardly and flow over the turbine blades 6 into a discharge channel 12. Pressures exerted by the flow of water on the turbine blades 6, with the relative pitch of the turbine blades 6, will cause the entirety of the turbine shaft assembly to rotate in the direction of arrow 14 as further illustrated in FIG. 1. This rotation of the turbine shaft assembly in the direction of arrow 14 will cause corresponding rotation of the generator rotor assembly 4. Rotation of the generator rotor assembly 4 will, through conventional means, cause the generation of electricity.

As previously described in the section entitled "Background of the Invention", an undesirable result of the water flow through the hydroelectric turbine structure 1 is cavitation erosion on the turbine blades 6 and the turbine liner wall 8. That is, the inner surface of the wall of the turbine liner wall 8, in addition to the surfaces of the turbine blades 6, are subject to erosion and pitting, primarily caused by cavitation as previously described herein. For purposes of repairing such surface deterioration, the gates (not shown) of the hydroelectric turbine structure 1 would first be closed. Correspondingly, and if necessary, water remaining within the turbine structure 1 can be removed by pumping or other conventional means.

For purposes of repairing the surface deterioration, and if desired, a temporary floor structure can be constructed across the turbine chamber 17 formed internally of the turbine liner wall 8. During repair operations, the floor structure 15 would remain stationary, notwithstanding rotation of the turbine blades 6 during repair as described in subsequent paragraphs herein.

When the water has been removed from the turbine chamber 17 and environmental conditions are appropriate for repair operations, a repair assembly 16 can be mounted adjacent a terminating end of one of the turbine blades 6 as further illustrated in FIG. 1. The repair assembly 16 is mounted to one of the turbine blades 6 in a manner so that specific repair operations can be undertaken with respect to the turbine liner wall 8 during rotation of the turbine blades 6. For example, the repair assembly 16 can comprise apparatus for undertaking grinding and welding operations during turbine blade rotation. In addition, apparatus for removing surface corrosion and epoxy, such as water blasting apparatus and sanding apparatus, can also be employed. Erosion can be repaired by a process of grinding away the eroded material, and replacing this material with new metal material by a welding operation, utilizing the appropriate components of the repair assembly 16.

Although not specifically shown in the drawings, the repair assembly can comprise any of numerous repair assembly structures. For example, the repair assembly 16 could comprise support members welded to the surface of one of the turbine blades 6, with the supports mounting a vertical member. A cutting or machining tool holding head could be mounted to the vertical member so that the holding head would travel along the member. An adjustment wheel or similar arrangement could be utilized to adjustably position the holding head along the vertical member. Such a structure could also comprise a seat for an operator riding the structure, and observing machining operations. A machining tool could extend from the head into a machining engagement with the surface of the liner wall 8.

Correspondingly, scaffolding could be temporarily attached to and supported by the turbine blades 6, with the scaffolding utilized to support conventional welding apparatus. The scaffolding structure could carry the vertical member, with the vertical member supporting a vertically movable welding head. As the turbine blades 6 are rotated, the machining tools and welding head would traverse the cylindrical surface of the liner wall 8. With respect to the welding arrangement, an operator could weld pitted areas of the turbine blades 6 during turbine blade rotation, as well as perform welding operations on the liner wall 8.

Following conditioning of the surfaces of the turbine blades 6 and the liner wall 8, weld material, such as stainless steel or other cavitational resistant alloys, could be applied to the liner wall 8 during rotation of turbine blades 6. After such application, further machining operations could be undertaken to "smooth" the stainless steel buildup on the liner wall 8. A description of various machining tools and an associated structure for mounting the same to hydroelectric turbine blades for performance of machining and repair operations is described in the Goings U.S. Pat. No. 3,793,698 and incorporated by reference herein.

For purposes of utilizing the repair assembly 16 as previously described herein, a means must be provided for achieving a steady and controllable rotation of the turbine shaft 2 and turbine blades 6. Preferably, the rotational speed is variable and may, for example, be in the range of zero to 200 r.p.m. In accordance with the invention, rotation of the turbine shaft 2 during repair operations is accomplished with a turbine turning mechanism 18 as generally shown in FIG. 1, and more specifically illustrated in FIGS. 2 and 3. As shown in FIG. 1, the turbine turning mechanism 18 can be mounted adjacent or approximately adjacent an outside edge of one of the turbine blades 6, in relatively close proximity to the turbine liner wall 8.

Figure 2:
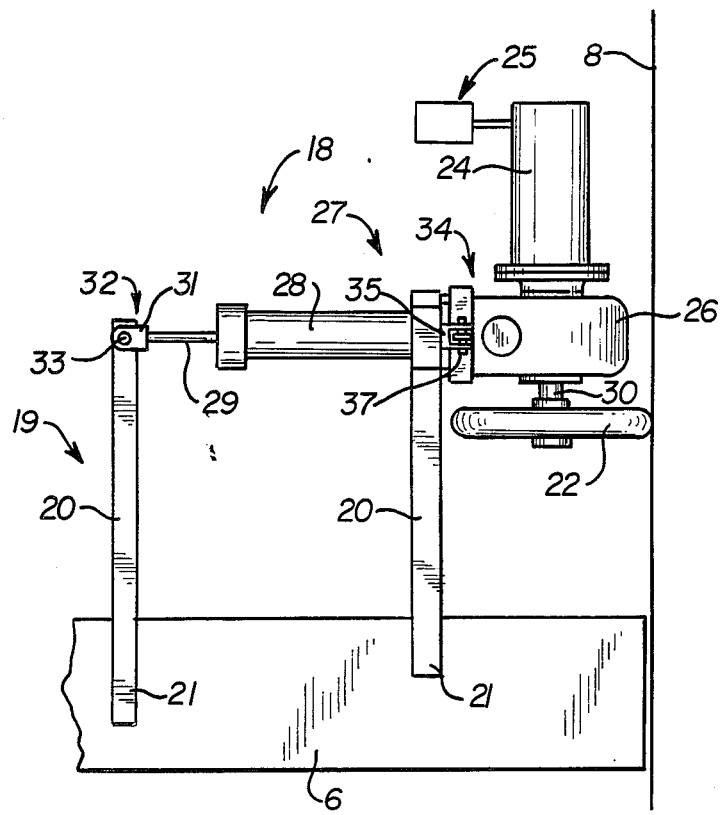
FIG. 2 is a side view of an embodiment of a turbine turning mechanism in accordance with the invention.
Figure 3:
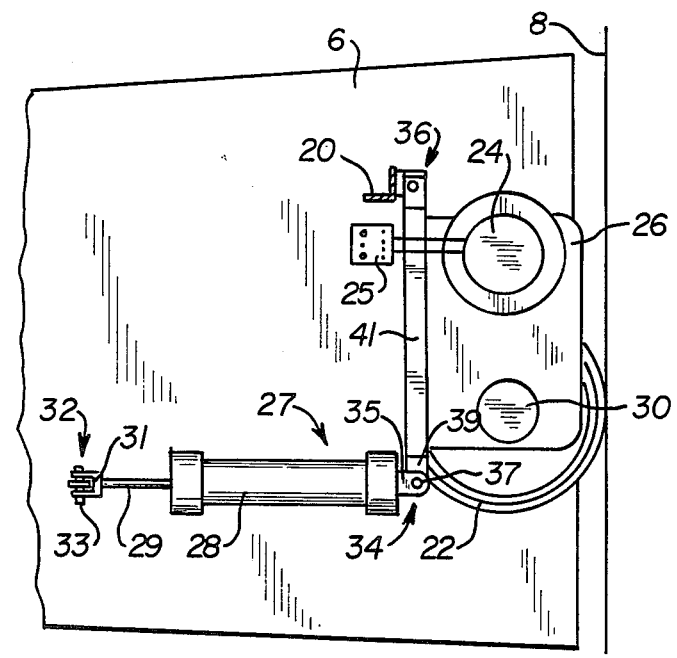
FIG. 3 is a plan view of the turbine turning mechanism shown in FIG. 2.

Referring to FIGS. 2 and 3, the turbine turning mechanism 18 can comprise a suitable mounting and support assembly 19 for securely attaching components of the turbine turning mechanism 18 to the turbine blades 6. For example, as specifically illustrated in FIG. 2, the turning mechanism 18 can comprise a series of support braces 20 or similar supporting elements secured to a blade 6 by welding or otherwise securing the lower ends 21 of the support braces 20 to the pitched surface of one of the blades 6. The structural configuration of the mounting assembly 19 can be any of a number of supporting structures. The principal requirement of the mounting assembly 1.9 is to provide a relatively rigid and secure attachment of the turbine turning mechanism 18 to the turbine blade 6.

As illustrated in FIGS. 2 and 3, the turning mechanism 18 further comprises a turning wheel 22 rotatably driven by a conventional motor drive assembly 24. The turning mechanism 18 is supported at a location along the turbine blade 6 so that the turbine turning wheel 22 is in relatively close proximity to the turbine liner wall 8. The turning wheel 22 can be of a conventional annular configuration, and should preferably be constructed of a durable and wear-resistant material. For example, a neoprene material can be employed.

The turning wheel 22 is coupled to a conventional drive shaft 30. In turn, the drive shaft 30 is coupled to the motor drive assembly 24 through a gear reduction mechanism 26. The gear reduction mechanism 26 is conventional in design and comprises a means for reduction of rotational speed of the drive shaft 30 and turning wheel 22, relative to operational speed of the motor drive assembly 24, while correspondingly increasing torgue of the shaft 30 and wheel 24.

In accordance with the invention, the turning wheel 22 is biased (as subsequently described herein,) so as to be selectively urged against the surface of the liner walls 8 with a sufficient frictional force between the wheel 22 and the liner walls 8 such that rotation of the turning wheel 22 relative to the liner walls 8 will result in the frictional forces between the same being translated into rotational forces exerted on the turbine blade 6. Accordingly, rotational operation of turning wheel 22 will cause the turbine blade 6 to which the turning mechanism 18 is attached to rotate and, correspondingly, will further cause rotation of the entirety of the turbine blades 6 and turbine shaft 2. With the positional relationship of the turning mechanism 18 relative to the configuration of the turbine blades 6 and the position of turbine shaft 2, a substantial "mechanical advantage" is created. That is, with the mounting of the turning mechanism 18 adjacent an outermost edge of a turbine blade 6, relatively small drive forces can be exerted by the motor drive assembly 24 on the turning wheel 22 to successfully rotate the relatively massive turbine shaft 2 and turbine blades 6. As an example, for a hydroelectric turbine facility of relatively conventional size, the motor drive assembly 24 can comprise a three-quarter horsepower electric motor.

Although not specifically illustrated in the drawings, the speed of rotation of the turning wheel 22 and, correspondingly, rotation of the turbine blades 6 and turbine shaft 2 can be controlled by a potentiometer 25 secured to and electrically interconnected with the motor drive assembly 24 so as to control motor speed operation. Potentiometer 25 is a conventional electrical unit which is relatively well known and commercially available.

The frictional forces existing between the turning wheel 22 and the liner wall 8 can be controlled in substantial part by a biasing assembly 27. In addition, the biasing assembly 27 can be employed to control the engagement or total disengagement of the turning wheel 22 bearing against the liner walls 8. As illustrated, the biasing assembly 27 comprises a conventional pneumatic compressed air piston mechanism 28. The piston mechanism 28 is mounted relatively horizontally in relationship to the configuration of the turbine structure 1. The piston mechanism 28 includes a conventional pneumatic cylinder having an axially moveable cylinder rod 29 extending inwardly toward the turbine shaft 2 relative to the liner wall 8. The distal end of the cylinder rod 29 is pivotably coupled to one of the support braces 20 through a pivot assembly 32. The pivot assembly 32 comprises a conventional yoke 31 having a pivot pin 33 extending through apertures in the legs of the yoke 31. The pivot pin 33 also extends through an aperture adjacent the upper end of the pivotably coupled support brace 20 in a manner so that the support brace 20 is engaged intermediate the legs of the yoke 31. With the yoke 31 having the configuration as illustrated in FIGS. 2 and 3, the cylinder rod 29 and piston mechanism 28 can pivot in a "pitch" direction relative to a horizontal plane extending through the piston rod 29.

Correspondingly, secured to the other end of the piston mechanism 28 opposing the end from which the cylinder rod 29 extends is a further yoke 35 which is rotated 90° relative to the spatial configuration of yoke 31. Extending through apertures in the legs of yoke 35 is a pivot pin 37 having a vertically disposed configuration. The yoke 35 and pivot pin 37 capture a bracket 39 located at one end of a mounting spar 41 extending in a horizontal plane along the inner edge of the gear reduction mechanism 26. The yoke 35, pivot pin 37 and spar bracket 39 can be characterized as a pivot means 34 for providing a further pivot of the biasing assembly 27. This arrangement allows for pivoting movement of the mounting spar 41 and associated gear reduction assembly 26 and turning wheel 22 in a horizontal plane relative to the biasing assembly 27.

In addition to the pivot assembly 32 and pivot means 34, a further pivot assembly 36 is associated with the other end of the mounting spar 41 as illustrated in FIG. 3. The pivot assembly 36 comprises substantially the same components as previously described with respect to the pivot assemblies 32 and 34. The pivot assembly 36 allows pivoting movement of the mounting spar 41, and associated gear reduction assembly 26 and turning wheel 22, relative to the support brace 20 to which the mounting spar 41 is pivotably coupled through pivot assembly 36.

Although not specifically shown in the drawings, the extension or retraction of the cylinder rod 29 relative to the piston mechanism 28 can be controlled through any suitable pneumatic or electromechanical control assembly which is relatively well known and commercially available with conventional piston mechanisms 28. As the piston rod 29 is extended, the piston mechanism 28 will move towards the liner wall 8, thereby exerting increasing forces of the turning wheel 22 against the liner wall 8. In part, this increase in forces will also cause the area of contact between the surface of liner wall 8 and the periphery of turning wheel 22 to correspondingly increase. The greater the forces exerted by extension of the cylinder rod 29, the greater the frictional forces will be exerted between the turning wheel 22 and the surface of liner wall 8. The exact position of cylinder rod 29 for use of the turning wheel 22 to rotate the turbine blades 6 and turbine shaft 2 relative to the surface of liner wall 8 will be dependent upon the specific structural configuration utilized for the turbine turning mechanism 18, materials from which the turning wheel 22 is constructed and various other parameters. The forces exerted by the turning wheel 22 against the surface of liner wall 8 should be sufficient so that rotation of turning wheel 22 through use of the motor drive assembly 24 and gear reduction mechanism 26 will cause the turning wheel 22 to essentially "roll" across the surface of liner wall 8, without any substantial slippage.

When it is desired to cease rotation of the turbine blades 6 and turbine shaft 2 by operation of turning wheel 22 against the surface of liner wall 8, the piston mechanism 28 and cylinder rod 29 can be controlled in any suitable manner so as to retract the cylinder rod 29 into the piston mechanism 28. This retraction will correspondingly cause the turning wheel 22 to be moved away from the surface of liner wall 8 so that there is no contact remaining therebetween.

In accordance with the foregoing, the rotation of the turbine blades 6 and turbine shaft 2 by operation of the turning wheel 22 against the liner wall 8 provides a requisite "steady" rotational movement for purposes of undertaking repairs of the liner wall 8 as previously described herein. Further, with the particular positioning of the turning mechanism 18 adjacent a distal end of one of the turbine blades 6, the mechanical advantage provided by this positioning is substantial. Accordingly, a relatively small motor drive assembly 24 can be employed for providing the requisite rotation of the turbine blades 6, notwithstanding the massive size of conventional turbine blades 6 and turbine shaft 2. Exerting forces between the turbine turning mechanism 18 and the liner wall 8 in a manner as described herein, for purposes of causes rotation of the turbine blades 6, provides a substantial advantage over other arrangements whereby the turbine blades 6 are rotated through externally generated forces which must be translated through the turbine shaft 2. Such other arrangements require substantially more energy and will tend to cause a relatively "jerky" rotational movement of the turbine blades 6.

It should be noted that various additions, substitutions and other modifications can be made to a turbine turning mechanism in accordance with the invention, without departing from the novel principles of the invention. For example, the turbine turning mechanism in accordance with the invention could employ components actually embedded or otherwise positioned on the liner wall, whereby interconnection of such liner wall components to components positioned on one of the turbine blades could be utilized to provide rotational forces to the turbine blades by exerting forces on a turbine blade relative to the liner wall at an outermost edge of the blade. Further, other types of "force translation" mechanisms could be employed in substitution of the turning wheel described herein.

It should further be noted that the particular structural configurations described herein are not meant to be an exhaustive enumeration of the configurations which can be utilized in accordance with the invention. Accordingly, it will be apparent to those skilled in the pertinent art that modifications and variations of the above-described illustrative embodiment of the invention can be effected without departing from the spirit and scope of the novel concepts of the invention.

The embodiments of the invention in which an exclusive property or privilege is claimed are defined as follows:

1. A method for use in a hydroelectric turbine structure comprising a turbine shaft, a generator rotor assembly coupled to an upper portion of said turbine shaft, a turbine blade assembly coupled to a lower portion of said turbine shaft and comprising a plurality of turbine blades extending radially from said turbine shaft, and a turbine chamber having a cylindrical configuration and formed by a vertically disposed turbine liner wall adjacent distal ends of said turbine blades, said method adapted for repair of pitting and general deterioration of surfaces of said liner wall and said turbine blades, and comprising the steps of:

removing water from said turbine chamber;

mounting a repair assembly at or substantially adjacent a distal end of at least one of said turbine blades, said repair assembly comprising conditioning devices for repairing surface deterioration of said liner wall;

mounting a turning apparatus at or substantially adjacent a distal end of at least one of said plurality of turbine blades;

rotating said plurality of turbine blades and said turbine shaft by exerting forces directly between said turning apparatus and said liner wall, thereby causing said conditioning devices to traverse said liner wall; and repairing deterioration of said liner wall by use of said conditioning devices during said traversal of said liner wall.

2. A method in accordance with claim 1, characterized in that said mounting of said turning apparatus comprises;

mounting a support assembly directly to at least one of said turbine blades;

mounting a turning wheel in a pivotable configuration relative to said support assembly;

engaging said turning wheel so as to be in frictional contact with said liner wall; and exerting rotational forces on said turning wheel to rotate said turning wheel, thereby causing said turning wheel to traverse said liner wall and further causing rotation of said turbine blades.

3. A method in accordance with claim 2, characterized in that said method further comprises ceasing of rotation of said turbine blades by retracting said turning wheel so that said turning wheel is no longer in frictional contact with said liner wall.

4. A method in accordance with claim 2, characterized in that said method further comprises driving of said turning wheel by exerting rotational forces on said turning wheel through a motor assembly coupled to said turning wheel.

5. A method in accordance with claim 4, characterized in that said motor assembly is coupled to said turning wheel through a gear reduction mechanism.

6. A method in accordance with claim 2, characterized in that said method further comprises mounting of said turning wheel to said support structure so that said turning wheel is selectively pivotable toward and away from said liner wall.

7. In an apparatus adapted for use in a hydroelectric turbine structure comprising a turbine shaft, a generator rotor assembly coupled to an upper portion of said turbine shaft, a turbine blade assembly coupled to a lower portion of said turbine shaft and comprising a plurality of turbine blades extending radially from said turbine shaft, and a turbine chamber having a cylindrical configuration and formed by a vertically disposed turbine liner wall adjacent distal ends of said turbine blades, said apparatus comprising means for rotating said turbine blades and said turbine shaft to facilitate repair of pitting and general deterioration of surfaces of said liner wall, the improvement wherein said means for rotating said turbine blades comprises:

a support structure adapted to be mounted to at least one of said turbine blades; and force exerting means mounted to said support structure so as to provide a direct exertion of forces between said force exerting means and said liner wall so that enablement of said force exerting means will cause a steady rotation of said turbine blades and said turbine shaft.

8. An apparatus in accordance with claim 7, characterized in that said force exerting means comprises:

rotating means engagable in frictional contact with said liner wall for exerting forces against said liner wall in a manner so as to cause traversal of said rotating means along said liner wall; and drive means coupled to said rotating means for exerting rotational forces on said rotating means.

9. An apparatus in accordance with claim 8, characterized in that said apparatus further comprises gear reduction means coupled to said drive means and to said rotating means for allowing said drive means to operate at an operating speed different from a rotation speed of said rotating means.

10. An apparatus in accordance with claim 8, characterized in that said rotating means comprises an annular turning wheel.

11. An apparatus in accordance with claim 10, characterized in that said annular turning wheel is composed of a neoprene material.

12. An apparatus in accordance with claim 7, characterized in that said apparatus further comprises pivot means coupled to said support structure and to said force exerting means for providing a pivot movement of said force exerting means relative to said support structure.

13. An apparatus in accordance with claim 12, characterized in that said force exerting means comprises:

rotating means engagable in frictional contact with said liner wall for exerting forces against said liner wall in a manner so as to cause said rotating means to traverse said liner wall; and drive means coupled to said rotating means for exerting rotational forces on said rotating means.

14. An apparatus in accordance with claim 13, characterized in that said pivot means comprises:

a piston cylinder;

a piston cylinder rod extendable and retractable relative to said piston cylinder, and having one end pivotably coupled to said support structure; and a pivot assembly coupled to said force exerting means and to another end of said piston cylinder, so as to allow said force exerting means to pivot toward and away from said liner wall.

15. An apparatus in accordance with claim 8, characterized in that said apparatus further comprises means for extending said rotating means into frictional contact with said liner wall, and for retracting said rotating means away from frictional contact with said liner wall.

16. An apparatus adapted for use in a hydroelectric turbine structure comprising a turbine shaft, a generator rotor assembly coupled to an upper portion of said turbine shaft, a turbine blade assembly coupled to a lower portion of said turbine shaft and comprising a plurality of turbine blades extending radially from said turbine shaft, and a turbine chamber having a cylindrical configuration and formed by a vertically disposed turbine liner wall adjacent distal ends of said turbine blades, said apparatus further adapted for rotation of said turbine blades and said turbine shaft during repair of pitting and general deterioration of surfaces of said liner wall, said apparatus comprising:

a support structure comprising a first support brace and a second support brace, with each of said support braces having one end secured adjacent a distal end of at least one of said turbine blades;

a piston mechanism comprising a substantially horizontally disposed piston cylinder and a piston cylinder rod extendable from said piston cylinder;

a first pivot assembly pivotably coupling an upper end of said first support brace to a distal end of said piston cylinder rod, so that said piston mechanism is pivotable in a pitch mode relative to a horizontal plane extending through said piston cylinder rod;

a turning mechanism mounting bracket;

a second pivot assembly for pivotably coupling one end of said piston cylinder with one end of said mounting bracket;

a third pivot assembly pivotably coupling another end of said mounting bracket to an upper end of said second support brace; and a turning mechanism mounted to said mounting bracket and comprising a turning wheel engagable in frictional contact with said liner wall.

17. An apparatus in accordance with claim 16, characterized in that said turning mechanism further comprises a motor drive assembly coupled to said turning wheel for exerting rotational driving forces on said turning wheel.

18. An apparatus in accordance with claim 17, characterized in that said apparatus further comprises a gear reduction assembly mounted to said mounting bracket and coupled to said motor drive assembly and to said turning wheel.

* * * * *